United States Patent
Weber et al.

(10) Patent No.: US 9,921,659 B2
(45) Date of Patent: Mar. 20, 2018

(54) GESTURE RECOGNITION FOR DEVICE INPUT

(71) Applicant: Amazon Technologies, Inc., Reno, NV (US)

(72) Inventors: Jason R. Weber, Mountian View, CA (US); Isaac S. Noble, Soquel, CA (US); Dong Zhou, San Jose, CA (US); Stephen M. Polansky, Santa Clara, CA (US); Guenael T. Strutt, San Jose, CA (US); Matthew P. Bell, Sunol, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/468,206

(22) Filed: Aug. 25, 2014

(65) Prior Publication Data
US 2015/0049017 A1    Feb. 19, 2015

Related U.S. Application Data

(63) Continuation of application No. 13/587,586, filed on Aug. 16, 2012, now Pat. No. 8,819,812.

(51) Int. Cl.
*G06F 21/00* (2013.01)
*G06F 3/01* (2006.01)
(Continued)

(52) U.S. Cl.
CPC .............. *G06F 3/017* (2013.01); *G06F 21/31* (2013.01); *G06F 21/36* (2013.01)

(58) Field of Classification Search
CPC .......... G06F 21/34; G06F 21/36; G06F 3/017; G06F 21/31; G06F 21/575; G06F 21/83; G06K 9/00389
See application file for complete search history.

(56) References Cited

U.S. PATENT DOCUMENTS 6,088,017 A * 7/2000 Tremblay et al. ............ 345/156
6,256,033 B1   7/2001 Nguyen
(Continued)

OTHER PUBLICATIONS

"Non-Final Office Action dated Jul. 30, 2013," U.S. Appl. No. 13/587,586, 15 pages.
(Continued)

*Primary Examiner* — Ghodrat Jamshidi
(74) *Attorney, Agent, or Firm* — Pierce Atwood LLP

(57) ABSTRACT

A user can make a symbol with their hand, or other such gesture, at a distance from a computing device that can be captured by at least one imaging element of the device. The captured information can be analyzed to attempt to determine the location of distinguishing features of the symbol in the image information. The image information is then compared to hand gesture information stored in, for example, a library of hand gestures for the user. Upon identifying a match, an input to an application executing on the computing device is provided when the image information contains information matching at least one hand gesture with at least a minimum level of certainty. The hand gesture could include a single "static" gesture, such as a specific letter in sign language, for example, or include two or more "static" gestures. The gesture could also include motion, such as hand movement.

20 Claims, 7 Drawing Sheets

(51) Int. Cl.
    *G06F 21/31*           (2013.01)
    *G06F 21/36*           (2013.01)

(56) References Cited

U.S. PATENT DOCUMENTS

| | | | |
|---|---|---|---|
| 8,261,090 | B1 | 9/2012 | Matsuoka |
| 2009/0079813 | A1 | 3/2009 | Hildreth |
| 2010/0040292 | A1 | 2/2010 | Clarkson |
| 2011/0221666 | A1* | 9/2011 | Newton et al. ............... 345/156 |
| 2011/0260962 | A1* | 10/2011 | Benko ................. G06F 3/04883 345/156 |
| 2011/0301934 | A1* | 12/2011 | Tardif ............................... 704/1 |
| 2012/0030637 | A1* | 2/2012 | Dey et al. ..................... 715/863 |
| 2012/0092286 | A1 | 4/2012 | O'Prey et al. |
| 2013/0004016 | A1 | 1/2013 | Karakotsios et al. |
| 2013/0039531 | A1* | 2/2013 | Basso ..................... G06F 3/017 382/103 |
| 2014/0043230 | A1* | 2/2014 | Galor ..................... G06F 3/005 345/156 |

OTHER PUBLICATIONS

"Final Office Action dated Jan. 15, 2014," U.S. Appl. No. 13/587,586, 17 pages.

\* cited by examiner

FIG. 3(a)
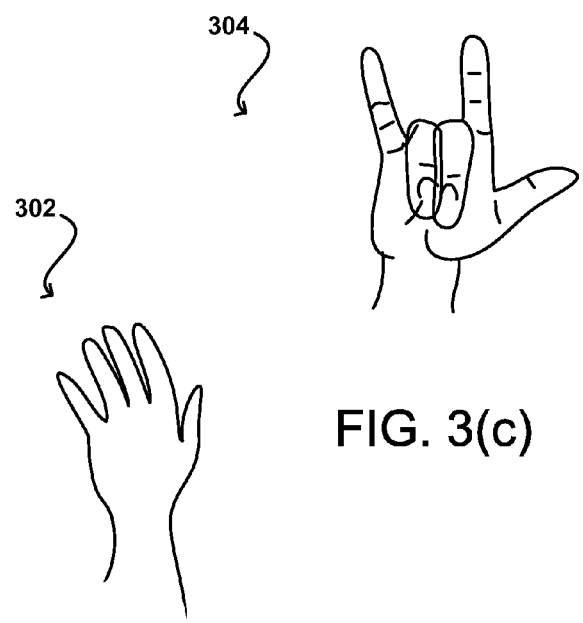
FIG. 3(c)
FIG. 3(b)
FIG. 4(a)
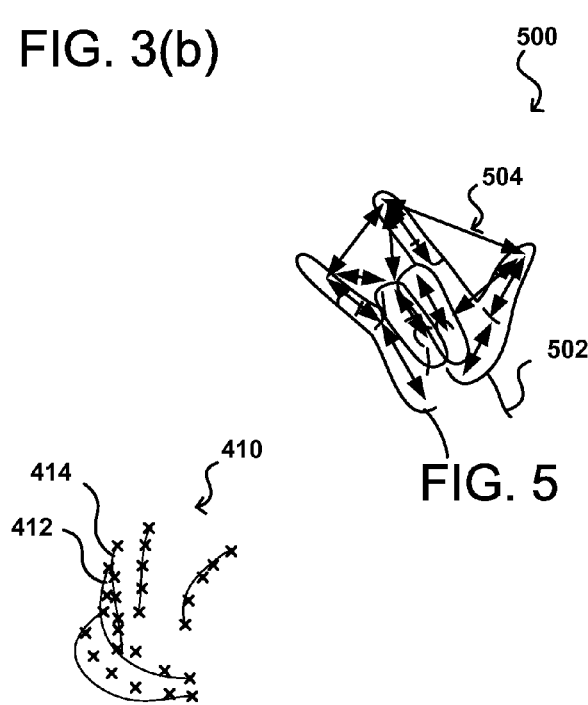
FIG. 5
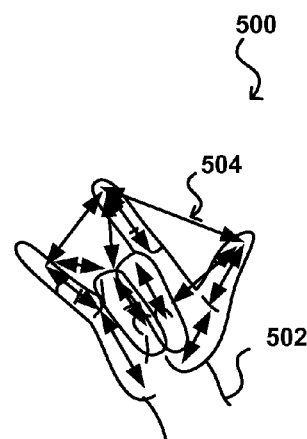
FIG. 4(b)

GESTURE RECOGNITION FOR DEVICE INPUT

CROSS-REFERENCES TO RELATED APPLICATIONS

This application is a continuation of allowed U.S. application Ser. No. 13/587,586, entitled "Gesture Recognition for Device Input," filed Aug. 16, 2012; of which the full disclosure of this application is incorporated herein by reference for all purposes.

BACKGROUND

People are increasingly using portable computing devices in a wider variety of ways and increasingly relying upon computing devices to access various types of content. Much of this content can be confidential or otherwise sensitive to the user. A user might store a list of personal contact information, or might install an application that provides access to that user's bank accounts, for example. Accordingly, it can be desirable to protect against unauthorized or inadvertent access to a device. In many instances, such protection requires a user to enter a password or other identifying information each time that user wants to access the device. For many users such repetitive validation can be distracting or even annoying. Thus, as technology advances and as people are increasingly using portable computing devices in a wider variety of ways, it can be advantageous to adapt the ways in which people access content through the same.

BRIEF DESCRIPTION OF THE DRAWINGS

Various embodiments in accordance with the present disclosure will be described with reference to the drawings, in which:

FIGS. 3(a)-3(c) illustrate example hand gestures that can be used as one or more identifiers in accordance with various embodiments;

FIGS. 4(a) and 4(b) illustrate an example motion and gesture that can be used as an identifier in accordance with various embodiments;

FIG. 5 illustrates an example gesture that can be used as an identifier in accordance with various embodiments;

DETAILED DESCRIPTION

Figure 1:
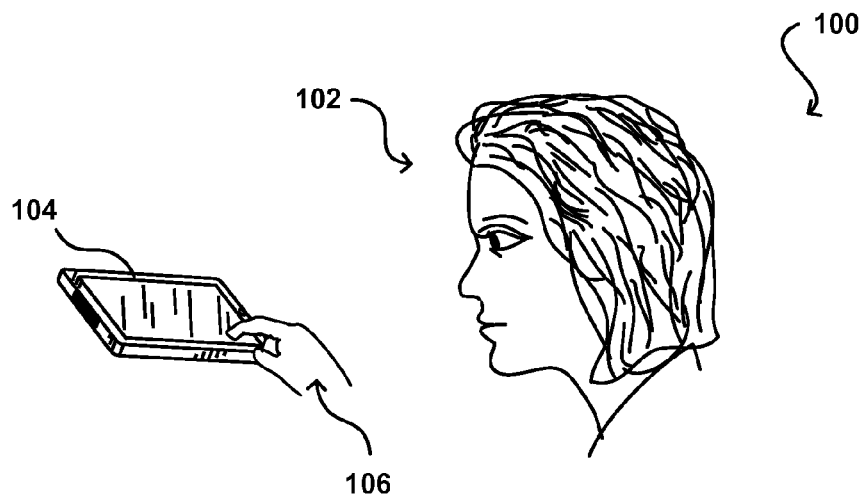
FIG. 1 illustrates an example environment in which various aspects can be implemented in accordance with various embodiments.

Systems and methods in accordance with various embodiments of the present disclosure may overcome one or more of the aforementioned and other deficiencies experienced in conventional approaches to providing input to a computing device. In particular, various embodiments enable a user to make a gesture with a feature such as one of the user's hands, for example. The computing device can capture one or more images (or video) of the feature during the performance of the gesture, which can be analyzed by the computing device (or a system, or service in communication with the computing device) in order to attempt to recognize the gesture. The recognition of the gesture can cause a corresponding action or function to be performed, such as to open an application, unlock certain functionality, or perform another such function. In at least some embodiments, the computing device determines position information for one or more features of the user's hand at one point in time and/or changes in the position information over a period of time, as represented in the captured image(s). The position information can be compared to position information stored for the user for use in identifying an application or function associated with a particular gesture.

In various embodiments, a user can form a symbol, or other such gesture, with his or her hand, at a distance from a computing device that can be captured by at least one imaging element of the device. When the computing device detects an object indicative of a user's hand forming such a symbol, the captured image(s) can be analyzed to attempt to determine the location of distinguishing features of the symbol, or of user's hand itself, in the image(s). The locations of these features then are compared to hand gesture information stored in, for example, a library of hand gestures for the user. Upon identifying a match with at least a minimum level of certainty, an input to an application executing on the computing device is provided. The hand gesture can include a single "static" gesture, such as a specific letter in sign language, for example, or include two or more "static" gestures. In at least some embodiments, the gesture can include motion, such as movement of a user's hand, a specific movement of a specific symbol, or movement associated with drawing a symbol in the air above the computing device with a finger, for example. The movement could be associated with a specific path or transition from a first "static" gesture to a second "static" gesture. These gestures can be customizable by the user and assigned to various functions or applications as shortcuts or as a security layer alternative to inputting a password or passcode to unlock a device or application. Further, the user can also teach or train the computing device to recognize new gestures.

In at least one embodiment, the captured image analysis may additionally include analysis of biometric information, such as the relations of various feature points in the gesture. For example, different users will have different relative finger lengths, palm widths, forearm lengths, and other such aspects, which can be combined with the gesture to help in determining a particular person's identity. Therefore, an unauthorized user making a correct hand gesture would be unable to cause the computing device to provide the corresponding input based on differences in the way the symbol appears for an unauthorized hand.

Various other applications, processes and uses are presented below with respect to the various embodiments.

Certain conventional approaches enable a user to provide input to a device through contact therewith. For example, FIG. 1(a) illustrates an example situation 100 wherein a user 102 is able to provide input to a computing device 104 by selecting an area of a touch screen, or other such element of the device, using at least one finger of the user's hand 106, or another such object. For example, the user 102 can unlock the device from a locked state by swiping a finger across the screen to reveal a numeric keypad for typing a password or passcode or by tracing a personalized pattern through a displayed grid of dots. However, in order to do this, the user 102 must touch the device. In this example, the user 102 must precisely follow the correct pattern on the screen with their finger in order to provide the proper input for unlocking the computing device 104. This can be an issue while driving a vehicle or in any other setting when it's preferable not to look at the device. Additionally, in many states it is illegal to physically interact with these devices while driving. Further, the touches made with the user's finger for authentication or for inputting a passcode often leave smudges, which are a security concern since the smudges can potentially be deciphered by an unauthorized user, who can then use the smudges as a guide to unlock the computing device 104. A more secure alternative for unlocking a computing device without physically touching or looking at the device while providing input is, therefore, desirable.

Figure 2:
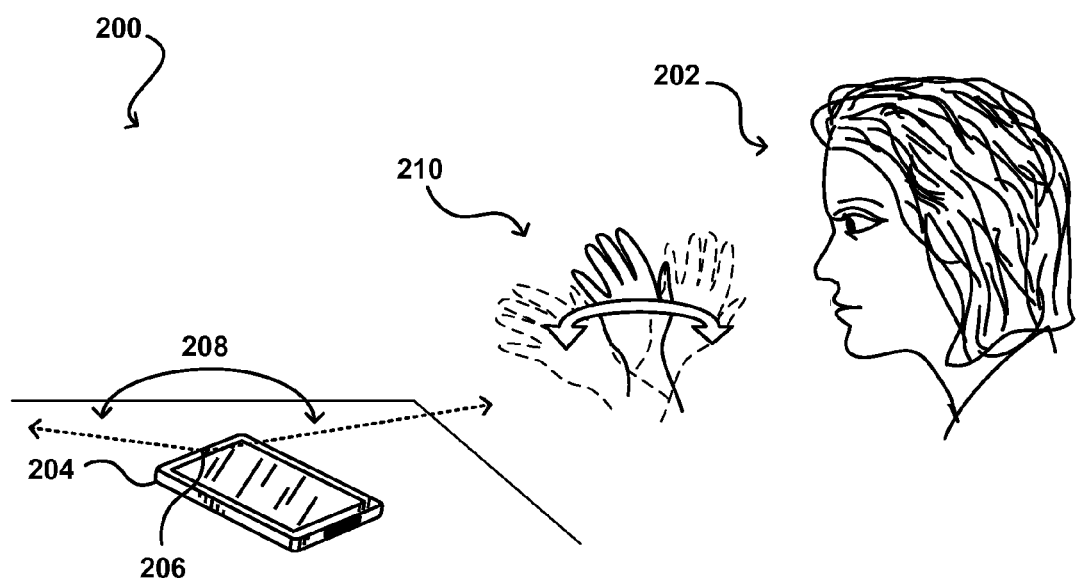
FIG. 2 illustrates another example environment in which various aspects can be implemented in accordance with various embodiments.

FIG. 2 illustrates an example situation 200 wherein a user 202 is providing a gesture-based input to a computing device 204 without touching the device in order to authenticate the user or securely unlock functionality thereon. Although a portable computing device (e.g., a smart phone, an electronic book reader, or tablet computer) is shown, it should be understood that various other types of electronic device capable of determining and processing input can be used in accordance with various embodiments discussed herein. These devices can include, for example, notebook computers, personal data assistants, cellular phones, video gaming consoles or controllers, smart television, and portable media players, among others. In this example, the computing device 204 has at least one image capture element 206 operable to perform functions such as image and/or video capture. Each image capture element may be, for example, a camera, a charge-coupled device (CCD), a motion detection sensor, or an infrared sensor, an electromagnetic field (EMF) sensor, or can utilize any other appropriate image capturing technology.

In this example, the user 202 is performing a selected gesture or motion using the user's hand 210. The motion can be one of a set of hand gestures or motions recognized by the device to correspond to a particular input or action, or can be a specific gesture associated with that particular user for authentication or identification purposes. If the motion is performed within a viewable area or angular range 208 of at least one of the imaging elements 206 on the device, the device can capture image information including at least a portion of the motion or gesture, analyze the image information using at least one image analysis, feature recognition, or other such algorithm, and determine a shape or symbol associated with the gesture and/or movement between subsequent frames or portions of the image information.

As mentioned above, a user might select a hand symbol to be used to authenticate themselves, unlock the computing device, initiate a function, perform an action, or launch an application. For example, FIGS. 3(a)-3(c) illustrate example possible hand gestures (300, 302, 304) wherein a user makes one or more of the hand gestures (300, 302, 304) within a capture range of at least one image capture element of the device. In this example, hand gesture 300 is of a user's pointer finger and thumb out and other fingers in toward their palm; hand gesture 302 is the user's hand with all five fingers out; and hand gesture 304 is the sign language symbol for love. Additionally, a user could choose the "peace" sign, the "hang loose" sign, the "Okay" sign, and the like. The information captured by the image capture element can be analyzed to determine a location of a specific feature in a single image or in each frame of multiple images captured over a period of time. In this example, the one or more hand gestures (300, 302, 304) can be identified, for example, through image analysis of a camera-captured image or intensity analysis of reflected IR radiation in a sensor-captured image. Various other imaging approaches can be used as well. The captured image information can be analyzed to determine a period over which a detected motion might correspond to a gesture or other such input. In many embodiments, it may be too resource intensive to analyze every frame of captured video, unless the device is in a low frame rate or other such mode. In some embodiments, the device will periodically analyze captured image information to attempt to determine if a feature in the image information appears to indicate a user making such a hand gesture or motion. In at least some embodiments, this can cause the device to begin to capture information with a higher frame rate or frequency, during which time a gesture or input analysis algorithm can be used to analyze the information. In other embodiments, the device might utilize a rolling buffer of image information, keeping image information from a recent period, such as the last ten seconds. When a possible gesture or user motion is detected, the device might also analyze the information in the buffer in case the device missed the beginning of a motion or gesture at the time of motion detection. Various other approaches can be used as well as should be apparent in light of the teachings and suggestions contained herein.

In at least some embodiments, a set of points are captured at relatively equidistant points in time. In some embodiments, such as where there is a single camera, the points might be determined in two dimensions (x, y). If depth information is capable of being determined, such as where there are two or more image capture elements doing triangulation or stereoscopic imaging, for example, the points might instead be determined in three dimensions (x, y, z) in space. The collection of points for a given motion or gesture then can be compared against sets of points stored in a library or other such data repository, where each of those sets corresponds to a hand gesture associated with a symbol, motion, combination of both a symbol and motion, or other such aspect. Using one or more point-matching algorithms, the determined collection of points can be compared against at least a portion of the stored sets until a set of points matches with a minimum level of certainty or confidence, etc. (or until there are no more sets of points to attempt to match). In some embodiments, a curve or continuous line or function can be fit to the collection of points and compared against a set of curves, for example, which can help improve the matching process in embodiments where the points are relatively far apart and the timing of those points can potentially otherwise affect the matching process.

In at least some embodiments, the process can further take advantage of the fact that the device can provide timing (absolute or relative) information for each point or between each pair of points with respect to a gesture associated with motion. Thus, each point can have an additional dimension (x, y, t) or (x, y, z, t) that can including timing information in addition to positional information. For example, one person might learn how to draw or trace a symbol, such as a signature, for example, of another person with a reasonable degree of accuracy. It will be much harder, however, for a person to also learn the varying speed and/or motion with which another person forms that signature (or other motion, gesture, etc.) Thus, having timing information in addition to position information can provide an additional layer of security or verification.

The sets of points can further be encoded according to any appropriate standard or framework. In some embodiments, each tracked or monitored point or feature of a user or other object can correspond to a stream of relatively continuous points. For multiple points (i.e., when tracking all five fingers of a user's hand) there can be multiple encoded streams. Each stream can be stored as a sequence of points for matching against one or more known sequences of points. In at least some embodiments, each point has a timestamp enabling speed, acceleration, or other such information to be determined. For a given feature, such as a user's hand, there might be ten features (e.g., brightest or closest points, identified feature points, etc.) that are monitored at an appropriate sample rate, such as between 100 Hz and 1 kHz, or at around 120 Hz for at least one embodiment. Such an approach might result in around one thousand points for a second-long period of time, which can provide a desired level of accuracy for identification while avoiding the processing of potentially millions of points if trying to do conventional image-based tracking In some embodiments, an algorithm might attempt to further reduce the number of points to be tracked and/or analyzed, such as when a given feature does not move substantially between capture times, etc.

In at least some embodiments, a device might track more than one point or feature over time. For example, FIG. 4(*a*) illustrates an example situation 400 wherein a user makes a gesture that involves all five fingers, here going from an open hand to a particular configuration of the user's fingers. If the location of each fingertip is able to be determined from the captured image information, the relative motion of each fingertip can be tracked in position and/or time. The motion of each fingertip can form a path 402, which can be analyzed using an approach such as those described above with respect to a single finger. In addition, however, the paths can also be compared with each other to provide additional information. For example, each user may have fingers of different length and hands of different size and shape, and might use slightly different separations during the motion and/or at the ends of the motion. Thus, in addition to getting five times the information from the five separate paths, the information can also be used to determine relative speeds and/or positions between the different features.

For example, FIG. 4(*b*) illustrates an example set of points 410 that could be determined for the motion of FIG. 4(*a*). In this example, it can be seen that the path of travel for each finger can be different, as well as the speed of each path from the perspective of the imaging element. Further, these paths can have a distinct orientation with respect to each other. For example, when this particular user makes the gesture, the paths 412 and 414 of two different fingers cross by a certain amount. For another user, the paths might cross by a different amount, or may not cross at all. Thus, the relative motions of multiple features can be yet another indicator of the identity of a person, as the way a user makes multiple motions can be compared against each other as well.

Further still, the image information can be analyzed to determine one or more physical characteristics of the user. For example, FIG. 5 illustrates an example image 500 captured showing a gesture being formed by the hand of a user 502. The user might have formed this gesture using a particular motion, as discussed above, or might simply want to use this particular configuration as an identifier. As discussed above, the image information can be analyzed to determine the location of specific features in the gesture, such as the distance 504 between adjacent fingertips, etc. In addition, however, various other factors can be analyzed as well, such as the relative lengths of each finger, palm dimensions, relative separations of fingers while making the gesture, and any of a number of other such aspects that might be unique for, and thus indicative of, a particular user. In this way, even if another person learns the user's identifying gesture, unless that other person has physical features substantially similar to those of the user, the person will be unable to fake a device into identifying or authenticating that person as the user of the device, etc. If available, other information can be used as well, such as the relative length of the user's forearm, thickness of the user's wrist, or other such information.

As mentioned, various types of information can be used to attempt to locate and track specific features over time. One approach utilizes ambient-light imaging with a digital camera (still or video) to capture images that can be analyzed with an image recognition algorithm. As is known in the art, and as illustrated in the example image 600 of FIG. 6(*a*), however, ambient light images can include information for a number of different objects and thus can be very processor and time intensive to analyze. For example, an image analysis algorithm would not only have to differentiate the hand from the door and sidewalk in the image, but would also have to identify the hand as a hand, regardless of the hand's orientation. Such an approach can require shape or contour matching, for example, which can still be relatively processor intensive. A less processor intensive approach would be to separate the hand from the background before analysis.

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). For example, FIG. 6(*b*) illustrates an example image 610 wherein an LED or other source of illumination is activated (e.g., flashed or strobed) during a time of image capture of at least one gesture sensor. As can be seen, since the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking In embodiments where the detection time is short, there will be relatively little power drained by flashing the LED in at least some embodiments, even though the LED itself might be relatively power hungry per unit time.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

Figure 6A:
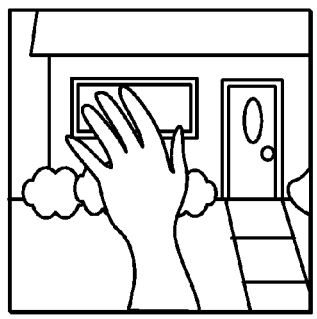
FIGS. 6(a)-6(d) illustrate example images for analysis with different types of illumination in accordance with various embodiments.
Figure 6B:
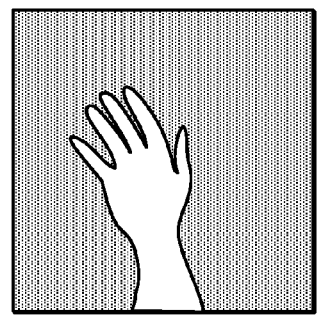
Figure 6C:
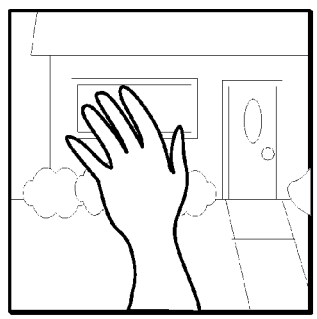
Figure 6D:
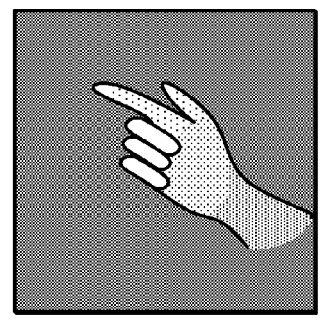

In embodiments where there is not a sufficiently fast shutter, where there is a rolling shutter effect, or in other such situations, it might be difficult to substantially prevent detecting reflections from other objects near the device. For example, FIG. 6(c) illustrates an example image 620 that could be captured using an infrared (IR) sensor, for example, wherein the hand is easier to locate in the image but the background is still present enough that an image processing algorithm might have to process other objects in the image, or might not be able to quickly locate a specific feature with a minimum level of certainty. In at least some embodiments, a device can capture both an ambient light image, such as in FIG. 6(a), and a reflected IR image, such as in FIG. 6(b). By having both images, one or more algorithms can be used to shift the images (to account for distance offset of the imaging elements) and then subtract the ambient light image 600 from the reflected IR image 620. The resulting image would be substantially dominated by the hand of the user. In at least some embodiments, a weighted subtraction can be performed when it is determined (due to contrast, lighting, or other such aspects) that the background information is likely much more intense in the ambient light image than the IR image, and vice versa. In some cases, a set of weighted comparisons can be performed until one or more features can be located with a minimum level of confidence.

In at least some embodiments, the intensity of the reflected IR can be used to determine one or more features to be tracked between images. For example, in the example IR image 630 of FIG. 6(d) the user is using a single finger to perform a motion as input to the device. In such an example, the tip of the user's finger typically will be the closest portion of the user's hand to the device. Thus, if the relative brightness can be determined with an acceptable level of differentiation, the tip of the user's finger can be determined at least in part by looking for the brightest region in the IR image. Other features such as the tip of the user's thumb or parts of other fingers might appear relatively bright as well, which can help to determine additional points to track that can be further indicative of an identity of the user.

Figure 7:
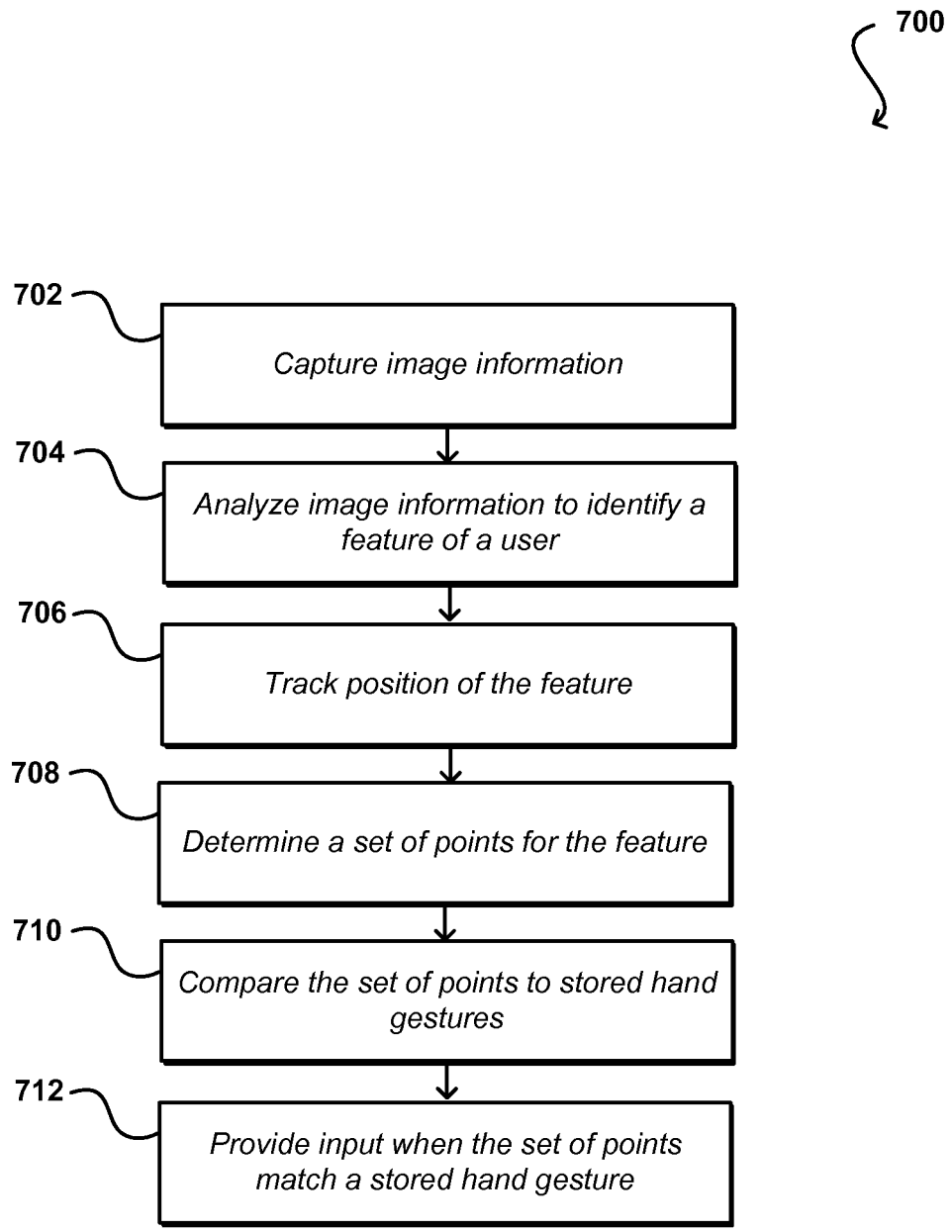
FIG. 7 illustrates an example process for determining user identity that can be performed in accordance with various embodiments.

FIG. 7 illustrates an example process 700 for enabling gesture identification for such a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In at least some embodiments, gesture detection is activated manually by the user or upon activation of an application, for example, but can also be continually active in at least a low power state in other embodiments. In another example, the computing device could initiate an image capturing mode upon detecting a sudden change in motion using a gyroscope, an accelerometer, or other motion sensor. In this example, gesture detection is activated and image information using at least one image capture element of the computing device is captured 702. In this and other examples, the image capturing element can include one or more of a camera, a charge-coupled device (CCD), EMF sensor, or an infrared sensor, or can utilize any other appropriate image capturing or object detection technology. In at least some embodiments, gesture detection is activated manually by the user or upon activation of an application, for example, but can also be continually active in at least a low power state in other embodiments. In this example, a computing device might run in a low power or low resolution mode, such as where there has not been recent gesture input. Such a mode can comprise, for example, capturing image information at a lower capture rate or analyzing captured information less frequently. In at least some embodiments, the image information is analyzed to identify a position of a hand of a user near the computing device 704. In this example, a position of the hand of the user is tracked over a period of time in the captured image information 706. In this example, a set of points including both position and time information for the hand of the user is determined during at least a portion of the period of time 708. As discussed, this can include user features recognized in a string of images, bright regions in IR image information, points of a certain proximity or distance in the image information, etc. One or more algorithms can not only attempt to locate such points or features, but also determine coordinates or other appropriate values and track values for those points between successive frames or other portions of the captured image information. As discussed, this can include capturing information for one or more points from an image capture stream and storing values for those points as a potential gesture set. In this example, the set of points is compared to at least one hand gesture stored for the user of the computing device 710. If the analyzed information is indicative of a potential gesture and a set of potential gesture points can be obtained, this potential gesture set can be compared against one or more gesture patterns in a gesture library or other such source. Any appropriate matching algorithm can be used as discussed or suggested herein, or as is known or used in the art for attempting to match point sets, functions, paths, or other such features. If no match can be found with at least a minimum confidence, level of certainty, or other such criterion or threshold, the gesture point information (and associated image information) can be discarded. In this example, however, an input is provided to an application executing on the computing device when the set of points matches one of the at least one hand gesture stored for the user with at least a minimum level of certainty 712. Various other approaches can be used as well as discussed or suggested elsewhere herein.

Figure 8:
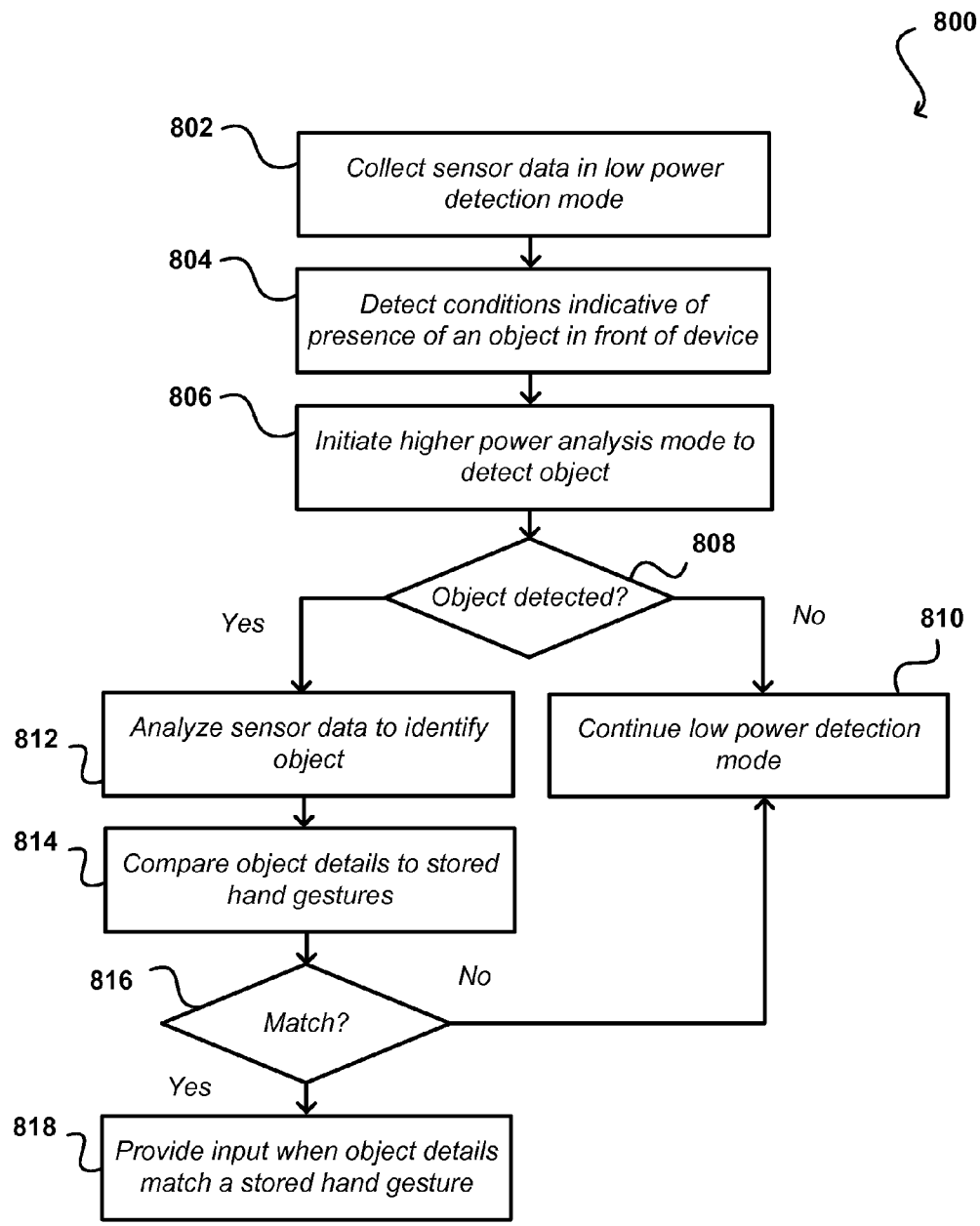
FIG. 8 illustrates another example process for determining user identity that can be performed in accordance with various embodiments.

FIG. 8 illustrates an example process 800 for enabling gesture identification for such a computing device that can be used in accordance with various embodiments. As mentioned above, it should be understood that, for any process discussed herein, there can be additional, fewer, or alternative steps performed in similar or alternative orders, or in parallel, within the scope of the various embodiments unless otherwise stated. In this example, the computing device collects sensor data 802 in a substantially constant low power detection or stand-by mode in order to detect conditions or circumstances indicative of the presence of an object, such as a user's hand. For example, a proximity sensor, such as an electro-magnetic field (EMF) sensor, could run in a low power scan mode until an object of interest is detected. Likewise, the computing device could run in a low power and/or in a low resolution image capture mode (low image capture rate) until an object, or conditions indicative thereof, is detected. In this example, the computing device detects at least one condition indicative of an object in close proximity 804. In this example, at least one of the above mentioned sensors could enter (or initiate) a normal (or higher) power analysis mode to further analyze the object 806. If an object is detected 808, the sensor data is analyzed to identify a hand gesture of the user of the computing device 812. Otherwise 808, the computing device will revert back to the low power scan mode 810. In this example, the sensor data for the object is compared to data stored for at least one hand gesture for the user 814. The data stored for that at least one hand gesture could be stored on the computing device or can be stored remotely on a server. If the sensor data substantially matches data stored for a hand gesture, associated with the user, for initiating an application or device function, such as authenticating the user and unlocking the device, 816, an input is provided to the application or to initiate the device function 818. If, however, no match is found 816, the computing device continues in the low power or scan mode 810.

In one embodiment, a user could authenticate himself or herself to a computing device or unlock the computing device by using an index finger to "write" the user's signature in the air in front of the device, within a capture range of at least one image capture element of the device. The information captured by the image capture element can be analyzed to determine a location of a specific feature in each frame or other segment of information, in order to track the position of that feature over time. In this example, the feature being tracked is the user's fingertip. The fingertip position can be determined, for example, through image analysis of a camera-captured image or intensity analysis of reflected IR radiation in a sensor-captured image. Various other imaging approaches can be used as well. As illustrated, while the user's fingertip is forming the "signature" in the air, the captured image information can be analyzed to determine a set of points along the signature, each corresponding to a determined point of the user's fingertip at a respective point in time, such as a time of capture of a respective frame of image information. An appropriate point to use in the image information for the fingertip in a given image frame, for example, can be determined using an appropriate method such as a local maxima determination or centroid determination, etc.

The captured image information can be analyzed to determine a period over which a detected motion might correspond to a gesture or other such input. In many embodiments, it may be too resource intensive to analyze every frame of captured video, unless the device is in a low frame rate or other such mode. In some embodiments, the device will periodically analyze captured image information to attempt to determine if a feature in the image information appears to indicate a user making a motion or gesture. In at least some embodiments, this can cause the device to begin to capture information with a higher frame rate or frequency, during which time a gesture or input analysis algorithm can be used to analyze the information. In other embodiments, the device might utilize a rolling buffer of image information, keeping image information from a recent period, such as the last ten seconds. When a possible gesture or user motion is detected, the device might also analyze the information in the buffer in case the device missed the beginning of a motion or gesture at the time of motion detection. Various other approaches can be used as well as should be apparent in light of the teachings and suggestions contained herein.

The points can be analyzed to determine that the user making the gesture moves the fastest during a portion of forming a cursive "j," for example. The user might move the slowest around a turn-around point, such as near a portion of a cursive "a" where the points are significantly close together. The portion of a signature near the end for this user might be at a speed roughly in-between. By looking at the relative distances between adjacent points in both position and time, a set of speeds and/or accelerations (or relatively continuous speed function, etc.) can be determined for the signature. This speed-related information then can also be compared against stored information for one or more users, and used to find a more accurate match than for position or trajectory alone. For example, two users might be able to sign the name "Jan" with sufficient similarity, but the motion and speeds they user to form that name will typically be significantly different, providing a more accurate identification result when receiving the signature from one of those users. In some embodiments, a set of speeds between each point can be determined for matching, while in other embodiments speeds and/or accelerations can be determined for specific points or regions of the gesture, as may correspond to areas of highest and lowest speed, etc.

FIGS. 9(*a*) and 9(*b*) illustrate front and back views, respectively, of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display element of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 812 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figures 9A, 9B:
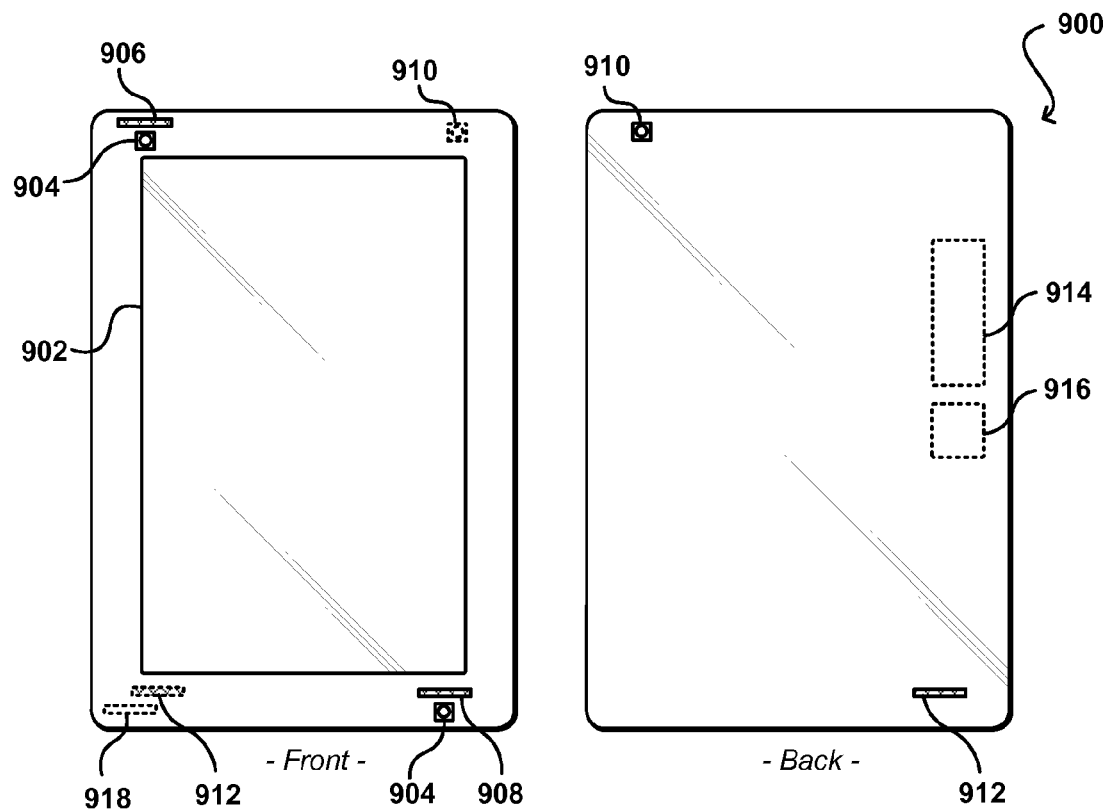
FIGS. 9(a) and 9(b) illustrates an example computing device that can be used in accordance with various embodiments.
Figure 10:
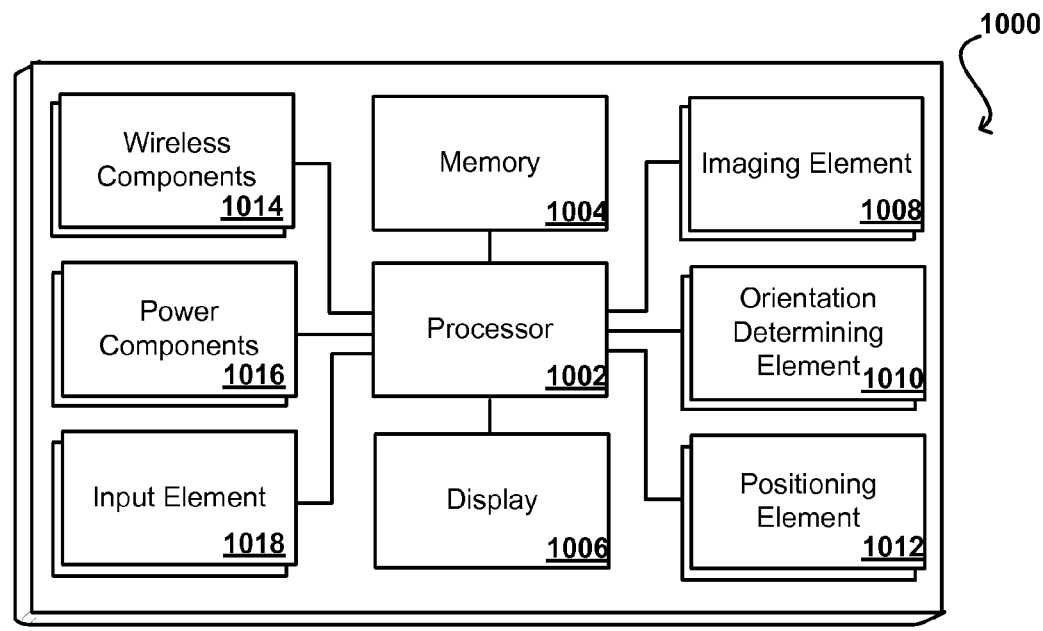
FIG. 10 illustrates an example configuration of components of a computing device such as that illustrated in FIGS. 9(a) and 9(b)

FIG. 10 illustrates a set of basic components of an electronic computing device 1000 such as the device 900 described with respect to FIGS. 9(a) and 9(b). In this example, the device includes at least one processing unit 902 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 11:
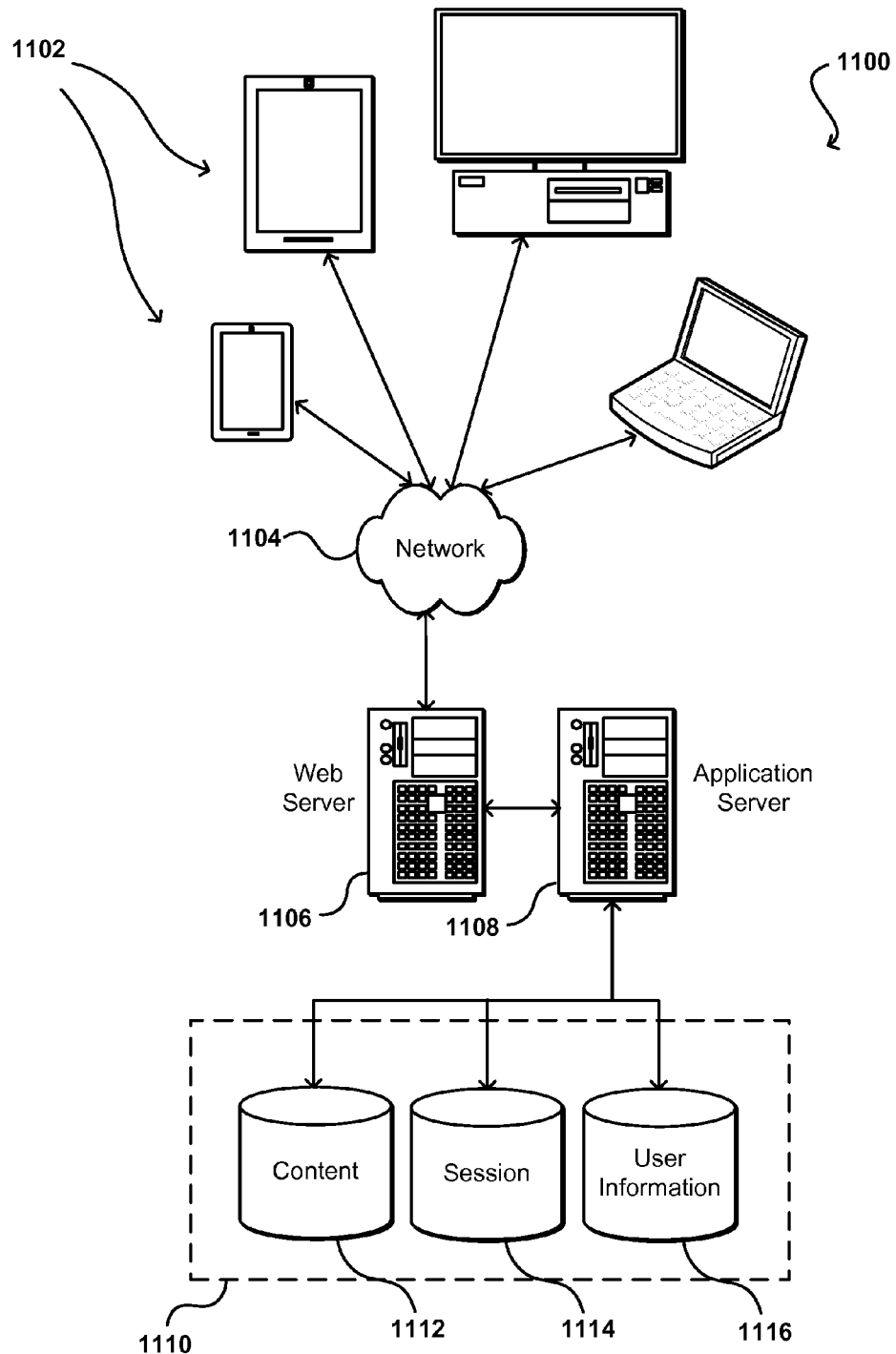
FIG. 11 illustrates an example environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   acquiring, by a computing device, image data over a period of time;
   storing the image data in a buffer;
   determining a first movement of at least a portion of a hand represented in a first portion of the image data;
   determining the first movement does not match gesture information in a gesture library;
   determining, after determining the first movement does not match the gesture information, a second movement of at least a portion of the hand represented in a second portion of the image data stored in the buffer, the second portion of the image data being acquired previous to the first portion of the image data in the period of time;
   determining, from the first movement and the second movement, a combined movement;
   determining gesture information in the gesture library that matches the combined movement; and
   sending an input, corresponding to the gesture information, to an application executing on the computing device.

2. The computer-implemented method of claim 1, wherein the first portion of the image data and the second portion of the image data correspond to at least one of partially overlapping or adjacent periods in time.

3. The computer-implemented method of claim 1, wherein the first movement and the second movement correspond to at least one of partially overlapping or adjacent movements in time.

4. The computer-implemented method of claim 1, wherein the application performs a function in response to receiving the input, the function being at least one of dialing a telephone number or unlocking the computing device.

5. The computer-implemented method of claim 1, further comprising:
   determining, in the first portion of the image data, a first position of at least one finger using at least one of image recognition, proximity detection, or intensity analysis; and determining, in the second portion of the image data, a second position of the at least one finger using at least one of image recognition, proximity detection, or intensity analysis.

6. The computer-implemented method of claim 1, further comprising:
receiving a request to assign a gesture as the input;
detecting movement of at least a portion of the hand in the image data; and
storing the movement as the input in the gesture library.

7. The computer-implemented method of claim 6, wherein the input is stored as a sequence of points in time corresponding to the movement.

8. The computer-implemented method of claim 7, further comprising:
comparing time information associated with the combined movement to the time stored for the sequence of points.

9. The computer-implemented method of claim 1, further comprising:
determining a combined movement speed corresponding to the combined movement, the combined movement speed including a first movement speed associated with the first movement and a second movement speed associated with the second movement; and
comparing the combined movement speed to a speed associated with the gesture information.

10. A computing device, comprising:
at least one processor;
at least one image capture element; and
at least one memory including instructions that, when executed, cause the computing device to:
acquire image data over a period of time using the at least one image capture element;
store the image data in a buffer;
determine a first movement of a hand represented in a first portion of the image data;
determine the first movement does not match gesture information in a gesture library;
determine, after determining the first movement does not match the gesture information, a second movement of the hand represented in a second portion of the image data stored in the buffer, the second portion of the image data being acquired previous to the first portion of the image data in the period of time;
determine, from the first movement and the second movement, a combined movement;
determine gesture information in the gesture library that matches the combined movement; and
send an input, corresponding to the gesture information, to an application executing on the computing device.

11. The computing device of claim 10, wherein the instructions further cause the computing device to:
after sending the input, deactivate a gesture input mode of the computing device in response to a period of inactivity.

12. The computing device of claim 10, wherein the first movement and the second movement correspond to at least one of partially overlapping or adjacent movements in time.

13. The computing device of claim 10, wherein the application performs a function in response to receiving the input, the function being at least one of dialing a telephone number or unlocking the computing device.

14. The computing device of claim 10, wherein the first portion of the image data and the second portion of the image data correspond to at least one of partially overlapping or adjacent periods in time.

15. A computing system, comprising:
at least one processor;
at least one image capture element; and
at least one memory including instructions that, when executed, cause the computing device to:
acquire, by a computing device, image data over a period of time using the at least one image capture element;
store the image data in a buffer;
determine a first movement of at least a portion of a user represented in a first portion of the image data;
determine the first movement does not match gesture information in a gesture library;
determine, after determining the first movement does not match the gesture information, a second movement of at least a portion of the user represented in a second portion of the image data stored in the buffer, the second portion of the image data being acquired previous to the first portion of the image data in the period of time;
determine, from the first movement and the second movement, a combined movement;
determine gesture information in the gesture library that matches the combined movement; and
send an input, corresponding to the gesture information, to an application executing on the computing device.

16. The computing system of claim 15, wherein the first portion of the image data and the second portion of the image data correspond to at least one of partially overlapping or adjacent periods in time, and the first movement and the second movement correspond to at least one of partially overlapping or adjacent movements in time.

17. The computing system of claim 15, wherein the instructions further cause the computing system to:
determine, in the first portion of the image data, a first position of at least one finger using at least one of image recognition, proximity detection, or intensity analysis; and
determine, in the second portion of the image data, a second portion of the at least one finger using at least one of image recognition, proximity detection, or intensity analysis.

18. The computing system of claim 15, wherein the instructions further cause the computing system to:
receive a request to assign a gesture as the input;
detect movement of at least a portion of the user in the image data; and
store the movement as the input in the gesture library.

19. The computing system of claim 18, wherein the input is stored as a sequence of points in time corresponding to the movement.

20. The computing system of claim 19, wherein the instructions further cause the computing system to:
compare time information associated with the combined movement to the time stored for the sequence of points.

* * * * *